(12) United States Patent
Chen (10) Patent No.: US 8,320,110 B2
(45) Date of Patent: Nov. 27, 2012

(54) NOTEBOOK COMPUTER STORAGE AND CHARGING CART

(75) Inventor: Feng-Ming Chen, Yung Ho (TW)

(73) Assignee: Chen-Source Inc., Taoyuan County (TW)

( * ) Notice: Subject to any disclaimer, the term of this patent is extended or adjusted under 35 U.S.C. 154(b) by 253 days.

(21) Appl. No.: 12/900,973

(22) Filed: Oct. 8, 2010

(65) Prior Publication Data

US 2012/0087074 A1 Apr. 12, 2012

(51) Int. Cl.
*G06F 1/16* (2006.01)

(52) U.S. Cl. .................. 361/679.02; 345/173; 455/557; 235/462.46; 320/119

(58) Field of Classification Search .................. 345/1.3, 345/87, 690, 98, 20, 582, 107, 169, 173, 345/174; 320/114, 134, 119, 108, 107; 108/42; 361/679.55, 679.29, 679.02, 679.07, 679.32, 361/679.33, 679.58, 679.4, 679.31, 679.57, 361/679.48, 725; 280/47.34; 455/456.3, 455/456.1, 41.2, 557, 41.3, 572, 420; 235/380, 235/492, 463.2, 462.46; 347/85, 10, 57, 347/11
See application file for complete search history.

(56) References Cited

U.S. PATENT DOCUMENTS

| 6,736,073 B2 * | 5/2004 | Ryburg ........................... 108/42 |
| 7,055,833 B2 * | 6/2006 | Wixted et al. ............... 280/47.34 |
| 2011/0064983 A1 * | 3/2011 | Yokoyama et al. ........... 429/100 |

* cited by examiner

*Primary Examiner* — Hung Duong
(74) *Attorney, Agent, or Firm* — Muncy, Geissler, Olds & Lowe, PLLC (57) ABSTRACT

A notebook computer storage and charging cart includes a cart having mobile racks arranged in stacks for carrying notebook computers, a power system having electrical power connectors connectable to an external power source and battery charges connected to the electrical power connectors and controllable by a power management device to charge the notebook computers subject to a predetermined charging time, and a network unit having a network connection apparatus installed in the cart and first and second network lines respectively connected between first and second ports network connection apparatus and the notebook computers for the transmission of network signals for real-time online data update and download.

11 Claims, 8 Drawing Sheets

NOTEBOOK COMPUTER STORAGE AND CHARGING CART

BACKGROUND OF THE INVENTION

1. Field of the Invention

The present invention relates to a notebook computer management technology and more particularly, to a notebook computer storage and charging cart, which comprises a cart for storing notebook computers in mobile racks thereof, a power system and a network unit for allowing the storage notebook computers to be synchronously charged and controlled to update and download data on the real time through the internet.

2. Description of the Related Art

Following fast development of electronic technology, many different high-speed multi-function mobile electronic devices, such as notebook computer, cell phone, multimedia player, PDA, and etc., have been continuously developed and widely used in our society as requisite tool means for the purposes of education, entertainment and working. When compared to a desk computer, a notebook computer has the advantages of small size and mobility. In consequence, many people use a notebook computer to substitute for a desk computer.

However, in order to meet the requirement of a notebook computer for light, thin, short and small characteristics, the precision of the design of the internal electronic components is critical. Further, for protecting notebook computers against impact or accidental damage during delivery, a notebook computer case may be used. A protective notebook computer case is known comprising a bottom shell defining therein a storage chamber, a cover shell for covering the bottom shell, and a stand received in the storage chamber and biasable between an extended position outside the storage chamber and a received position in the storage chamber. This design of protective notebook computer case is functional; however it is designed for carrying one single notebook computer only. A school, organization or company may purchase a big number of notebook computers to satisfy the demands for information classification and software environment. After a use of multiple notebook computers in a room, the notebook computers may be directly kept on the desk or desks. Managing notebook computers in this manner is not a good way. Further, the notebook computers that are directly kept on a desk or desks after each use may be stolen by a thief.

Further, when using a protective notebook computer case to receive a notebook computer, the protective notebook computer case has no any charging function to charge the storage notebook computer. In consequence, a power supply problem is inevitable. Before using a protective notebook computer to carry the storage notebook computer, the user may have to use a battery charge to charge the notebook computer with an external power source, allowing working of the notebook computer for a certain length of time. This power management method is less efficient.

Further, following change in learning environments and knowledge explosion in our society, internet-based education has become one of the hot learning sources for extension education and diversified knowledge learning. An internet-based education allows the use of notebook computers to download education software through the Internet or a local area network for online learning. When a user is going to update the data in a notebook computer that is stored in a protective notebook computer case, the user must remove the notebook computer from the protective notebook computer case and start up the notebook computer, and then connect the notebook computer to the Internet of local area network for updating education software or other software programs. When a scene manager is going to update a big number of notebook computers, the scene manager must spend a lot of time and labor to finish the update work. It is very inconvenient to manage multiple notebook computers and the related network connection.

SUMMARY OF THE INVENTION

The present invention has been accomplished under the circumstances in view. It is one object of the present invention to provide a notebook computer storage and charging cart, which facilitates management, battery charging and network connection of multiple notebook computers.

To achieve this and other objects of the present invention, a notebook computer storage and charging cart comprises a cart that has multiple mobile racks arranged in a stack in each of multiple storage chambers thereof for carrying notebook computers individually, a power system installed in the cart and connectable to an external power source for charging the storage notebook computers, and a network unit installed in the cart and adapted for connecting the storage notebook computers to the Internet or an external network for allowing on-line data update.

DETAILED DESCRIPTION OF THE PREFERRED EMBODIMENT

Figure 1:
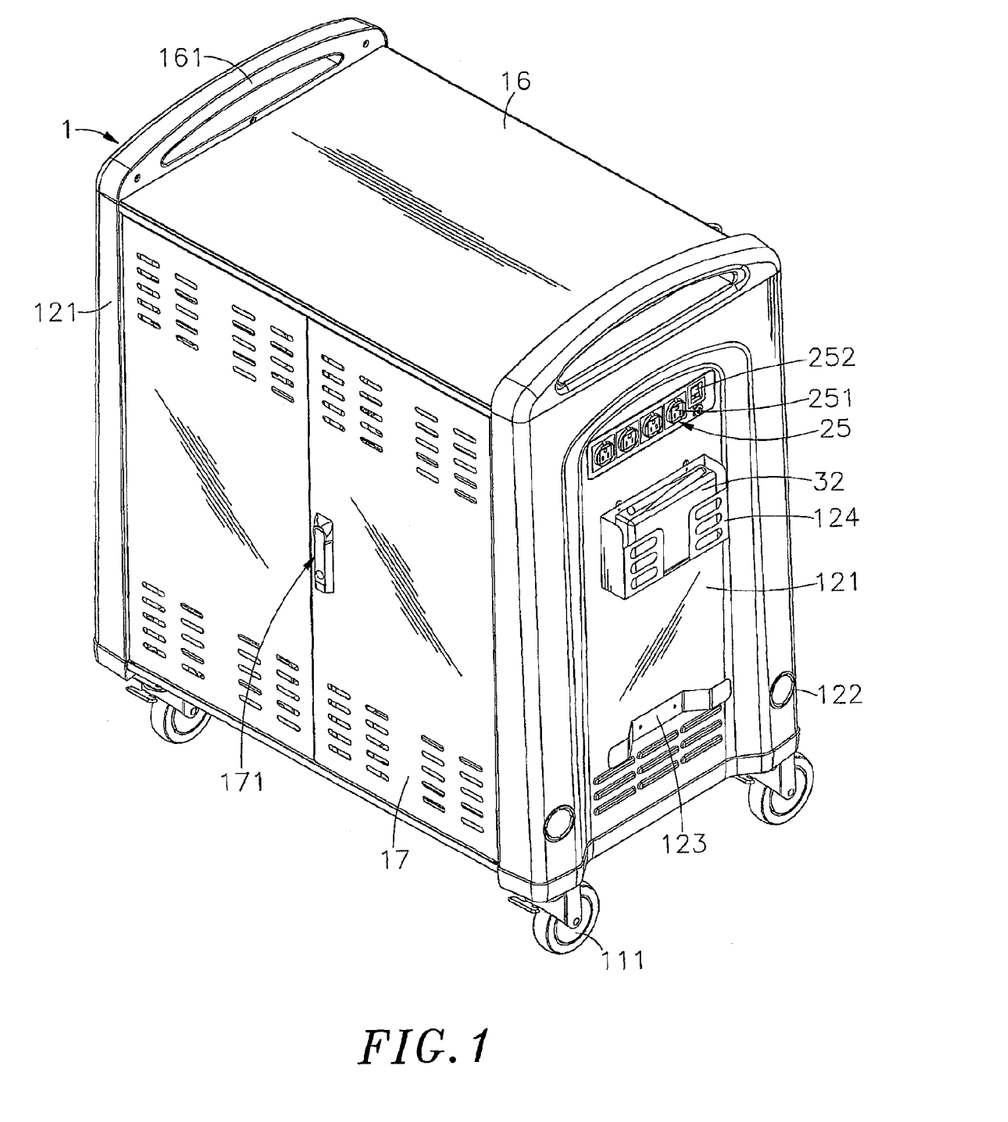
FIG. 1 is an elevational view of a notebook computer storage and charging cart in accordance with the present invention.
Figure 2:
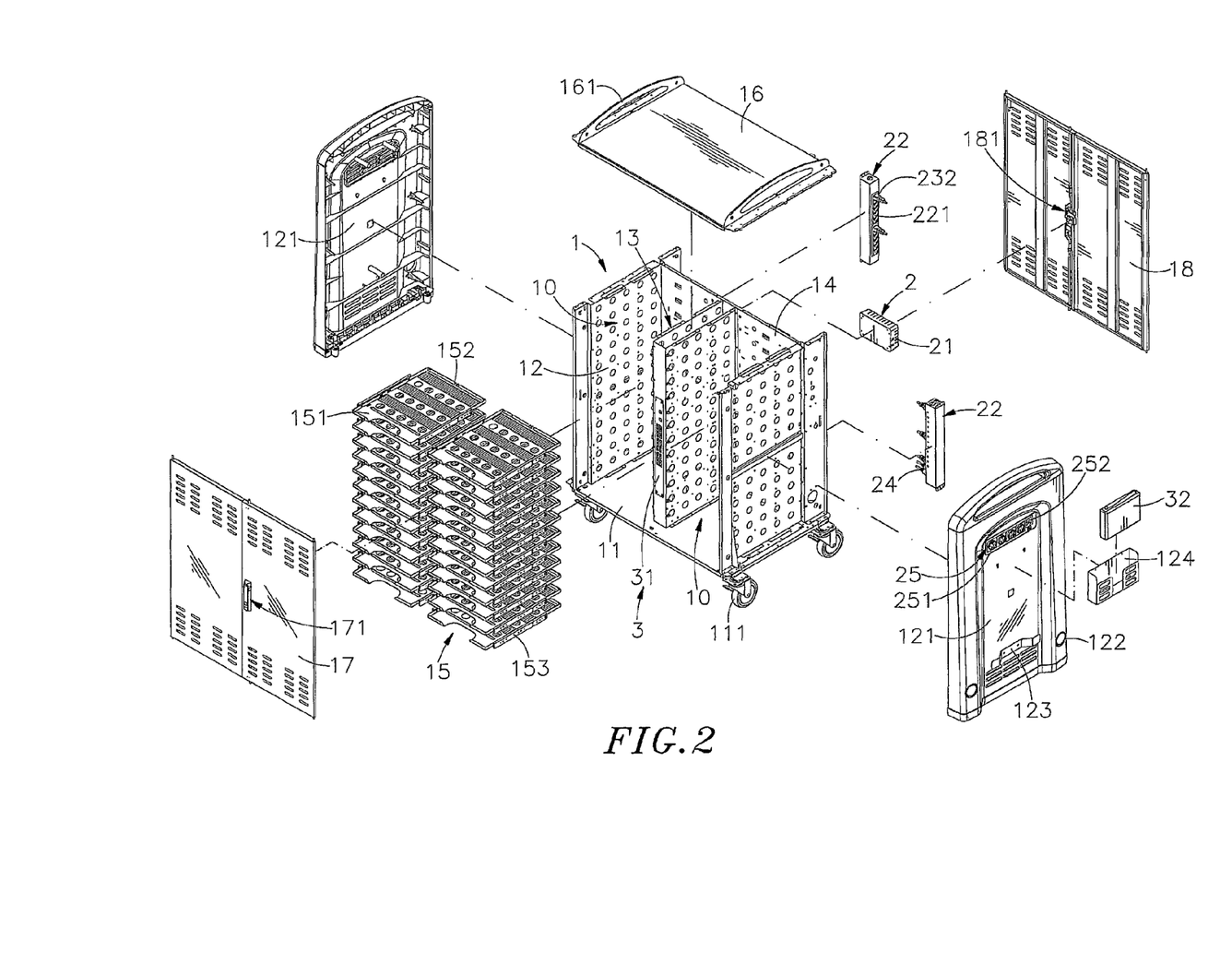
FIG. 2 is an exploded view of the notebook computer storage and charging cart in accordance with the present invention.
Figure 3:
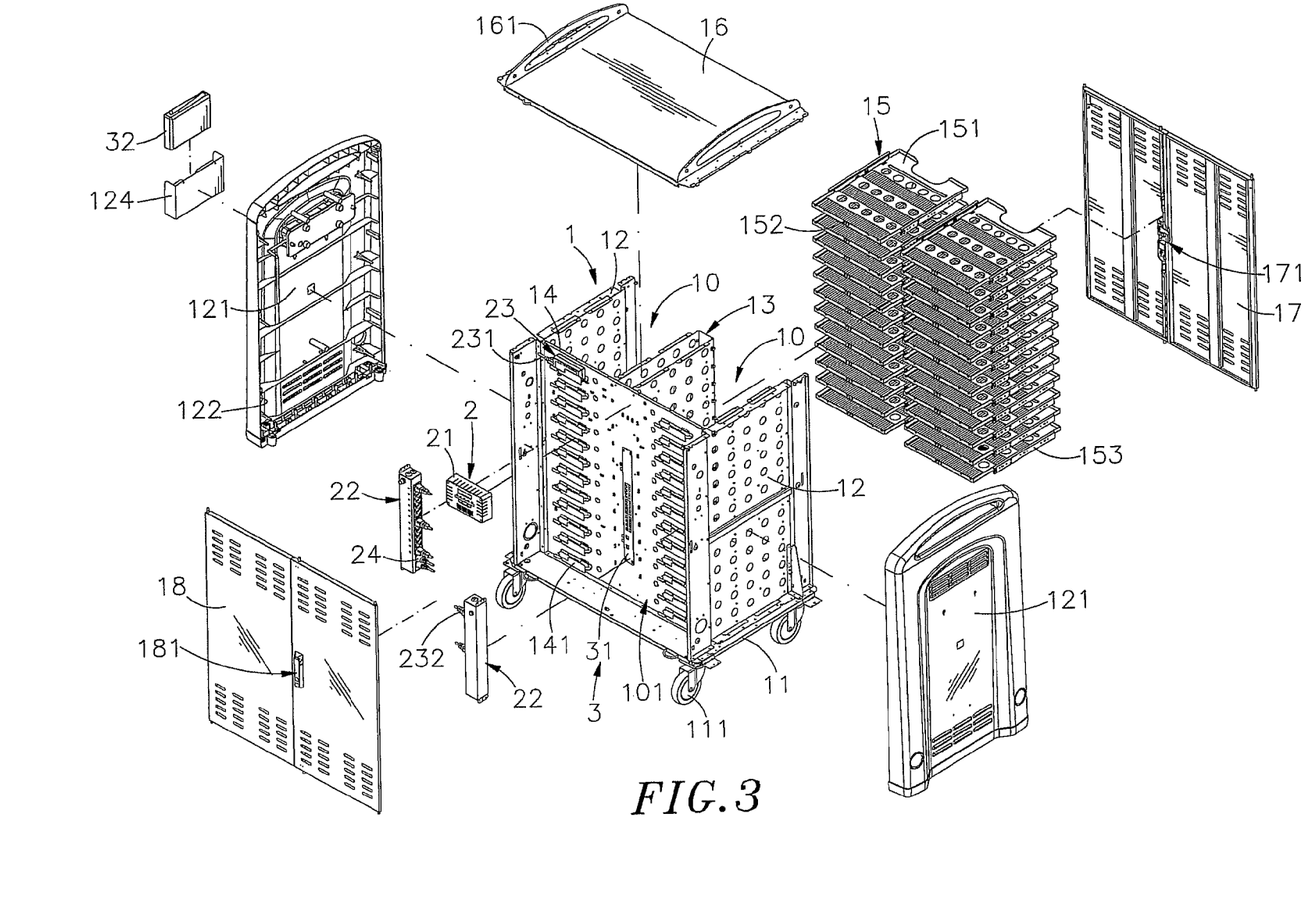
FIG. 3 corresponds to FIG. 2 when viewed from another angle.

Referring to FIG. 1, a notebook computer storage and charging cart in accordance with the present invention is shown comprising a cart 1, a power system 2 and a network unit 2.

The cart 1 comprises a base frame 11, two upright side panels 12 respectively upwardly extended from two opposite lateral sides of the base frame 11, at least one partition panel 13 arranged on the base frame 11 between the two upright side panels 12 in a parallel manner relative to the two upright side panels 12, an upright back panel 14 upwardly extended from a rear side of the base frame 11, a plurality of storage chambers 10 surrounded by the upright side panels 12, the at least one partition panel 13 and the upright back panel 14, a plurality of mobile racks 15 detachably mounted in the storage chambers 10 and arranged in a stack in each storage chamber 10, a rear chamber 101 defined in one side of the upright back panel 14 opposite to the storage chambers 10, a top cover 16 fastened to the upright side panels 12, the at least one partition panel 13 and the upright back panel 14 at the top over the storage chambers 10, a handle 161 located on each of the two distal ends of the top cover 16, two front door panels 17 respectively hinged to the two upright side panels 12 and adapted for closing the storage chambers 10, and two rear door panels 18 respectively hinged to two opposite lateral sides of the upright back panel 14 and adapted for closing the rear chamber 101.

Further, the base frame 11 is equipped with wheel means, for example, castors 111 to facilitate movement. The cart 1 further comprises two side cover shells 121 respectively fastened to the two upright side panels 12 on the outside. Each side cover shell 121 has a plurality of through holes 122. Further, each side cover shell 121 has mounted thereon a bracket 123 and a box 124. Further, the upright back panel 14 has a plurality of locating blocks 141 arranged at the back side thereof (the side opposite to the storage chambers 10) at different elevations corresponding to each storage chamber 10 and a plurality of wire holes 142 around the locating blocks 141. Further, the mobile racks 15 can be designed for mounting in the storage chambers 10 in a vertical position. Alternatively, the mobile racks 15 can be designed for mounting in the storage chambers 10 in a horizontal position. According to the present preferred embodiment, the mobile racks 15 are horizontal trays 151, each having a plurality of wire grooves 152. Further, sliding rails 153 are respectively affixed to the upright side panels 12 and the at least one partition panel 13 at different elevations so that the horizontal trays 151 can be slid in and out of the storage chambers 10 smoothly.

The power system 2 comprises a power management device 21 and at least one, for example, a plurality of electrical power connectors 22 respectively electrically connected to the electrical power management device 21 by transmission lines 211, each electrical power connector 22 having installed therein a plurality of electric sockets 221, and a plurality of battery chargers 23 and power cables 24 electrically connectable to the electric sockets 221 of the electrical power connectors 22. Each battery charger 23 comprises a first adapter cable 231 electrically connectable to one electric socket 221 of one electrical power connector 22 and a second adapter cable 232 connectable to a notebook computer 4. The power cables 24 are adapted for connecting the electric sockets 221 of the electrical power connectors 22 to an external power source 5 that can be an AC power supply adapter or city power supply outlet (see FIG. 6) for input of AC voltage into the electric sockets 221 of the electrical power connectors 22 for enabling the battery chargers 23 to convert inputted AC voltage into different DC voltages for output. The power system 2 further comprises a plurality of expansion electrical power connectors 25 respectively electrically connected to the power management device 21 by a respective cable (not shown). Each expansion electrical power connector 25 comprises a plurality of electric sockets 251 for power output, and a plurality of power switches 252 operable to switch on/off the electric sockets 251 respectively.

Figure 4:
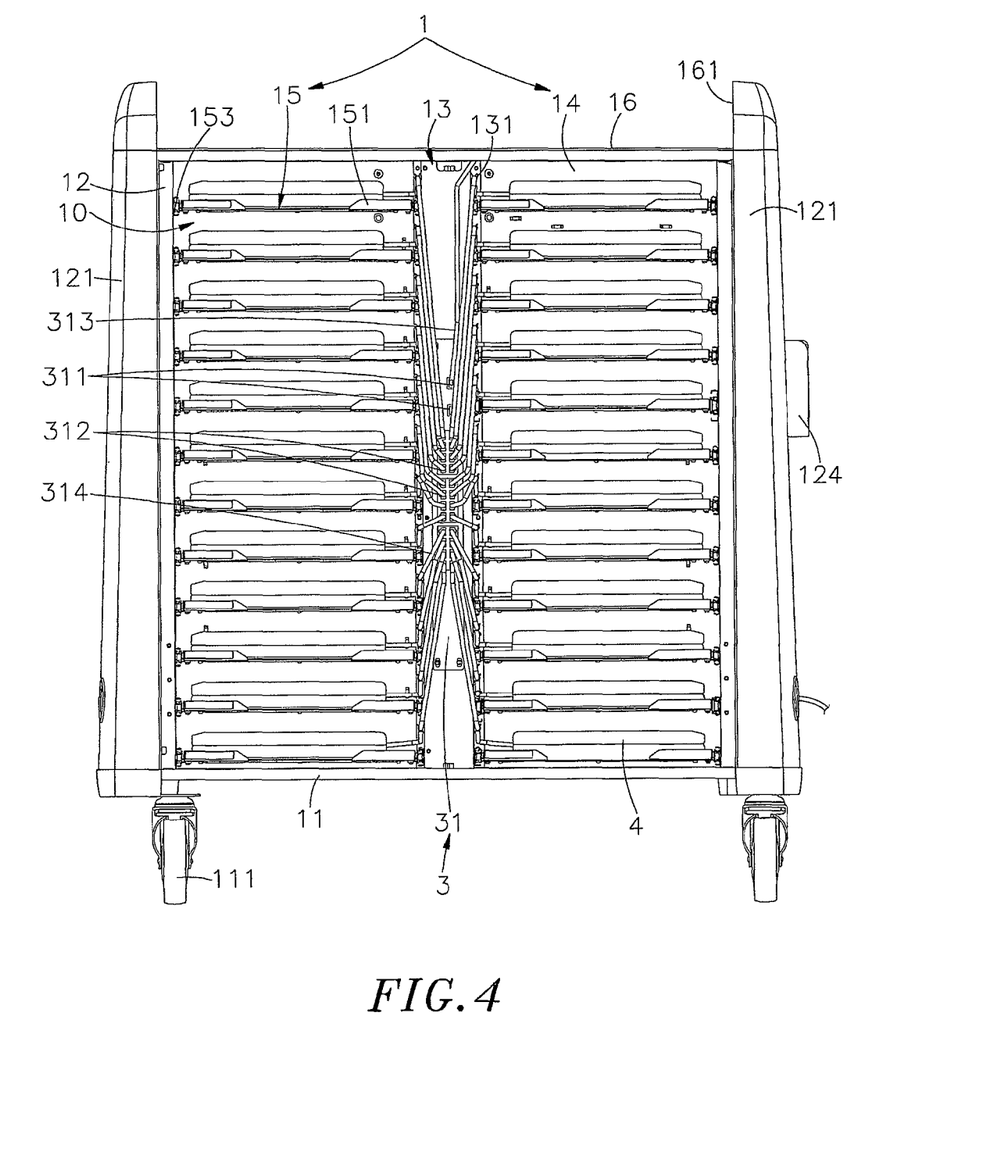
FIG. 4 is a front view of the notebook computer storage and charging cart in accordance with the present invention.
Figure 5:
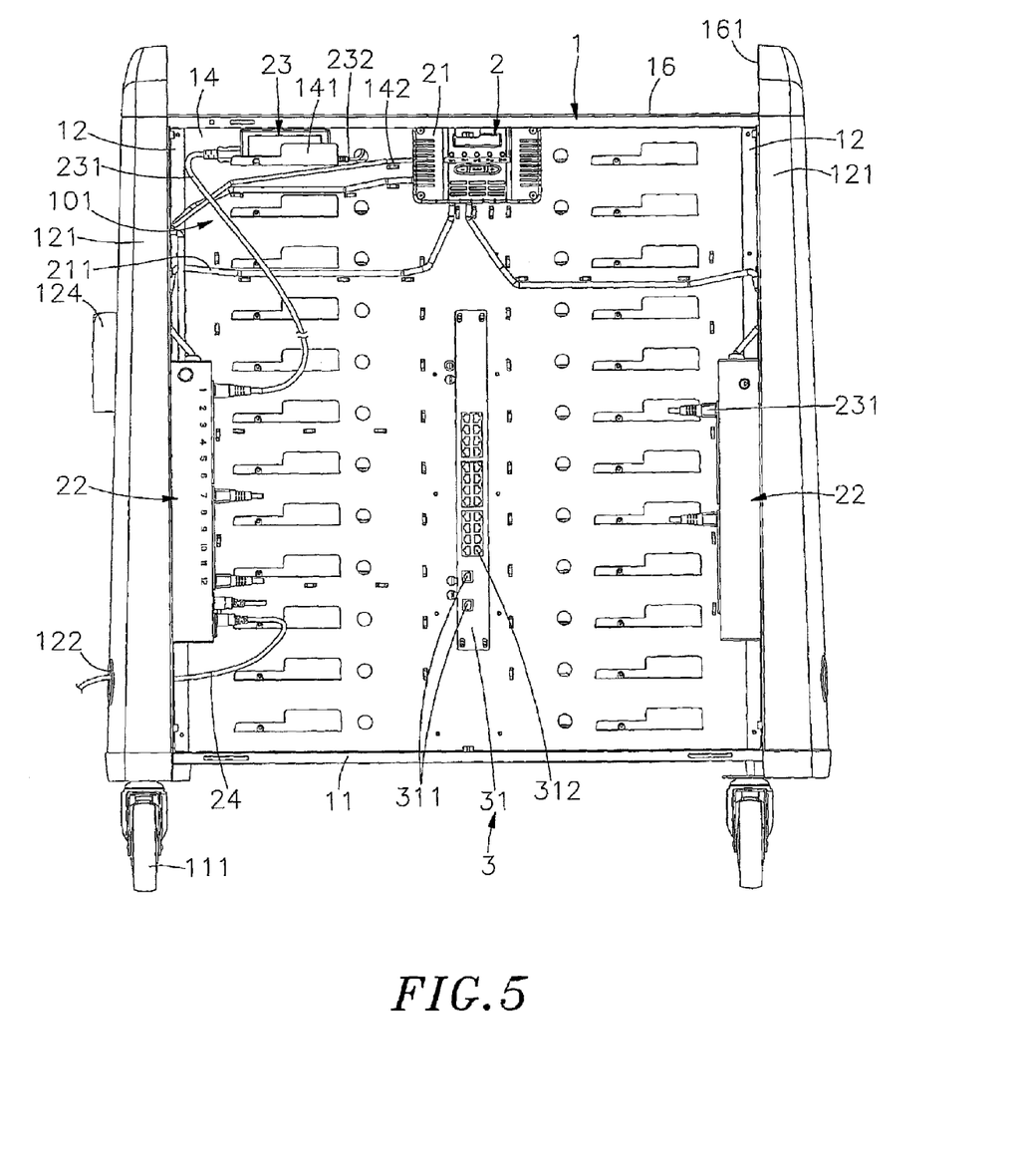
FIG. 5 is a rear side view of the notebook computer storage and charging cart in accordance with the present invention.

The network unit 3 comprises a network connection apparatus 31 and a signal transmitting and receiving device 32 in communication with the network connection apparatus 31 for transmitting and receiving network signals. The network connection apparatus 31 comprises a plurality of first ports 311, a plurality of second ports 312, a plurality of first network lines 313 respectively connected to the first ports 311 and adapted for connection to external network equipments or the signal transmitting and receiving device 32 (see FIG. 7), a plurality of second network lines 314 respectively connected to the second ports 312 and adapted for connection to notebook computers 4 (see FIG. 4). Further, the network connection apparatus 31 can be router or hub. Further, the first ports 311 and the second ports 312 are RJ45 Ethernet jacks for the connection of external network equipments or notebook computers. Further, the signal transmitting and receiving device 32 can be an AP (access point) or WAP (wireless access point) that matches the network connection apparatus 31 and the first network lines 313 for communication with external networks.

Referring to FIGS. 2, 3, 5 and 6, accommodate the power system 2 in the rear chamber 101 of the cart 1 between the upright back panel 14 and the rear door panels 18, enabling the power management device 21 to be affixed to the upright back panel 14 on the middle and the electrical power connectors 22 to be respectively affixed to the upright side panels 12 inside the storage chambers 10 and the battery chargers 23 to be respectively installed in the locating blocks 141 of the upright back panel 14. Thereafter, connect (the electrical plugs of) the first adapter cables 231 of the battery chargers 23 to the electric sockets 221 of the electrical power connectors 22, and then insert the second adapter cables 232 of the battery chargers 23 through respective through holes (not shown) on the upright back panel 14 adjacent to the respective locating blocks 141 and then arrange the second adapter cables 232 into a S-shaped condition and set the second adapter cables 232 in the wire grooves 152 of the horizontal trays 151 of the mobile racks 15 for enabling the excessive length part of each second adapter cables 232 to be wound round one respective locating block 141. After each second adapter cable 232 has been adjusted to a proper length, insert each second adapter cable 232 through one adjacent wire hole 142 near the respective locating block 141 and secure the respective second adapter cable 232 in place with a cable binder (not shown). Thus, the battery chargers 23 are steadily secured to the respective locating blocks 141 of the upright back panel 14, facilitating operation and arrangement.

Therefore, connect the electrical plugs at one end of each of the power cables 24 into the electric sockets 221 of the electrical power connectors 22, and then insert the electrical plugs at one end of each of the power cables 24 through respective through holes on the upright side panels 12 and the through holes 122 of the side cover shells 121 to the external power source (AC power supply adapter or city power supply outlet) 5. When the user is going to operate one handle 161 of the top cover 16 in moving the notebook computer storage and charging cart or when the notebook computer storage and charging cart is not in use, the excessive length part of each power cable 24 can be wound round the bracket 123 at the associating side cover shell 121, avoiding stretching of the power cables 24 to damage the city power supply outlet or tangling of the power cables 24 with the user's legs or other external objects to cause accidental injuries.

Thereafter, install the network connection apparatus 31 of the network unit 3 in the partition panel 13 of the cart 1 to have the first ports 311 and the second ports 312 be disposed at the front edge of the partition panel 13, and then connect one respective plug (not shown) of each of the first network lines 313, which have the respective other plugs respectively connected to the first ports 311, to the mating ports of the signal transmitting and receiving device 32 for communication with an external network system wirelessly. The second network lines 314 that are respectively connected to the second ports 312 can be forced into respective network line holders 131 at two sides of the partition panel 13 corresponding to the mobile racks 15 (see FIG. 7), and then connect the electrical plugs (not shown) at the other end of each of the second network lines 314 to the mating ports of notebook computers 4, thereby finishing the installation.

In the aforesaid arrangement, the power system 2 is accommodated in the rear chamber 101 of the cart 1 between the upright back panel 14 and the rear door panels 18. This arrangement is simply an example of the present invention. Alternatively, the power management device 21 and electrical power connectors 22 of the power system 2 can be respectively mounted inside the cart 1 at any suitable locations, facilitating cable arrangement and operation.

Figure 6:
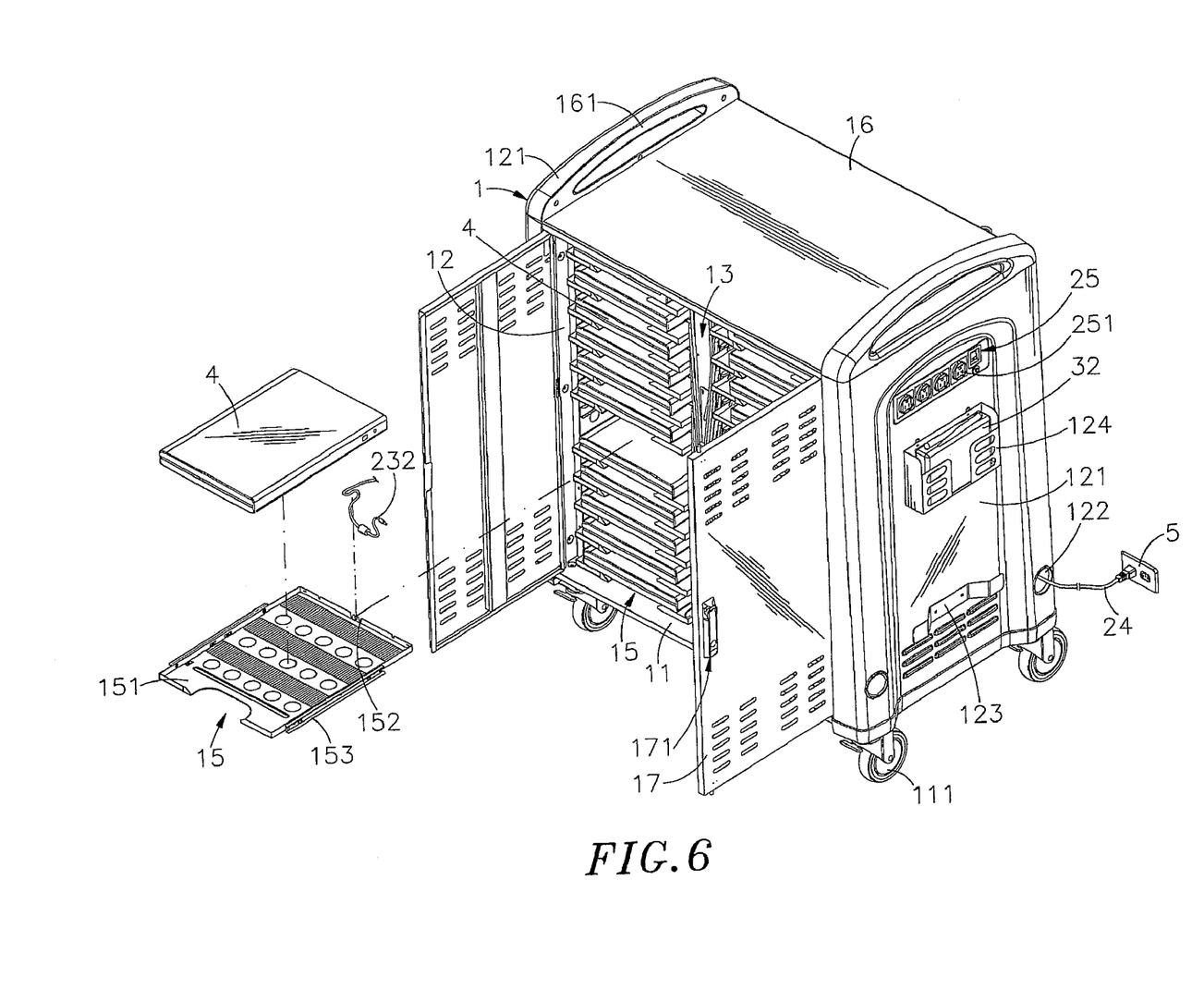
FIG. 6 illustrates the front door panels of the notebook computer storage and charging cart opened and one tray removed from the cart for the loading of a notebook computer according to the present invention.
Figure 7:
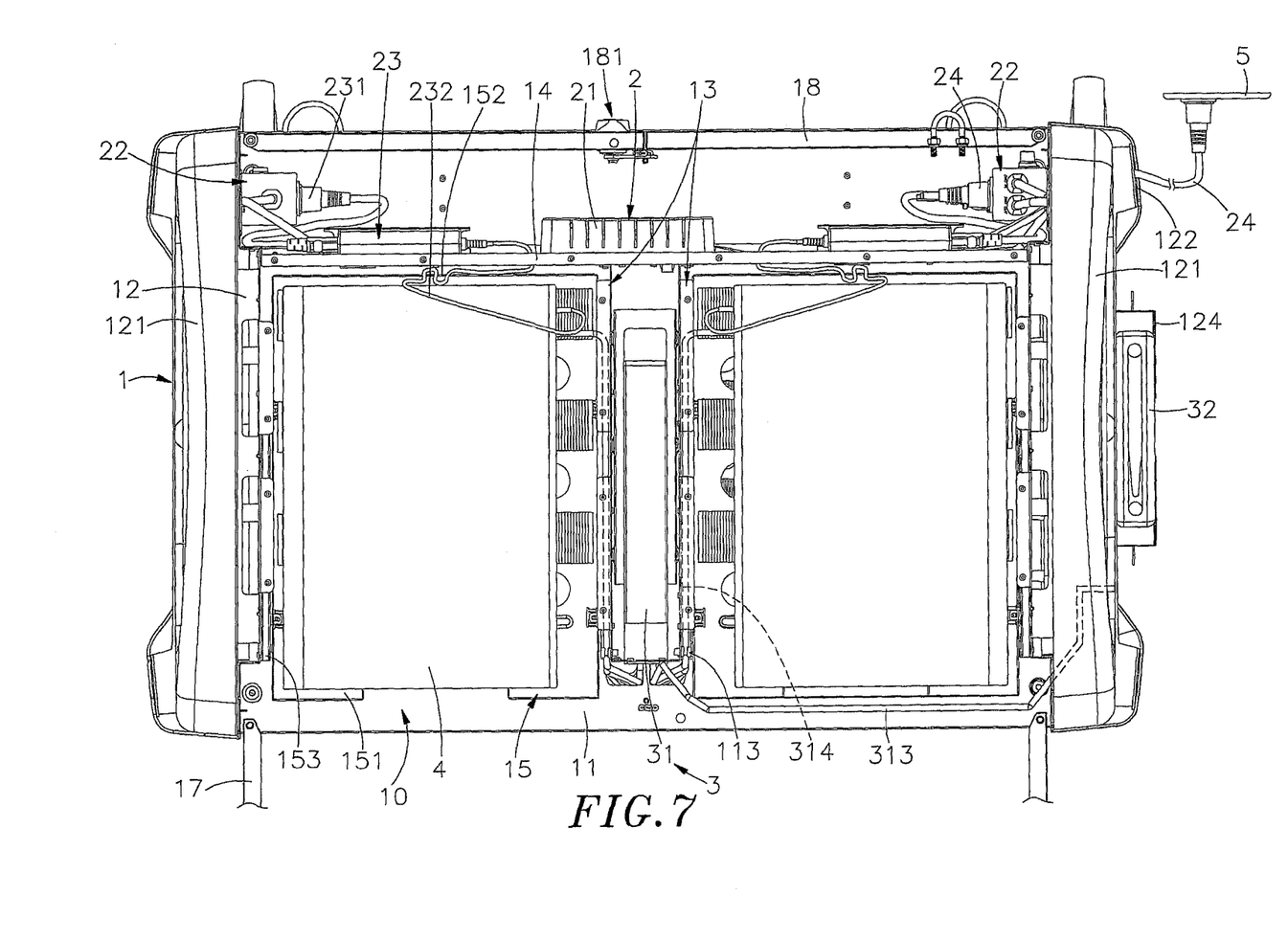
FIG. 7 is a top view of the notebook computer storage and charging cart in accordance with the present invention.
Figure 8:
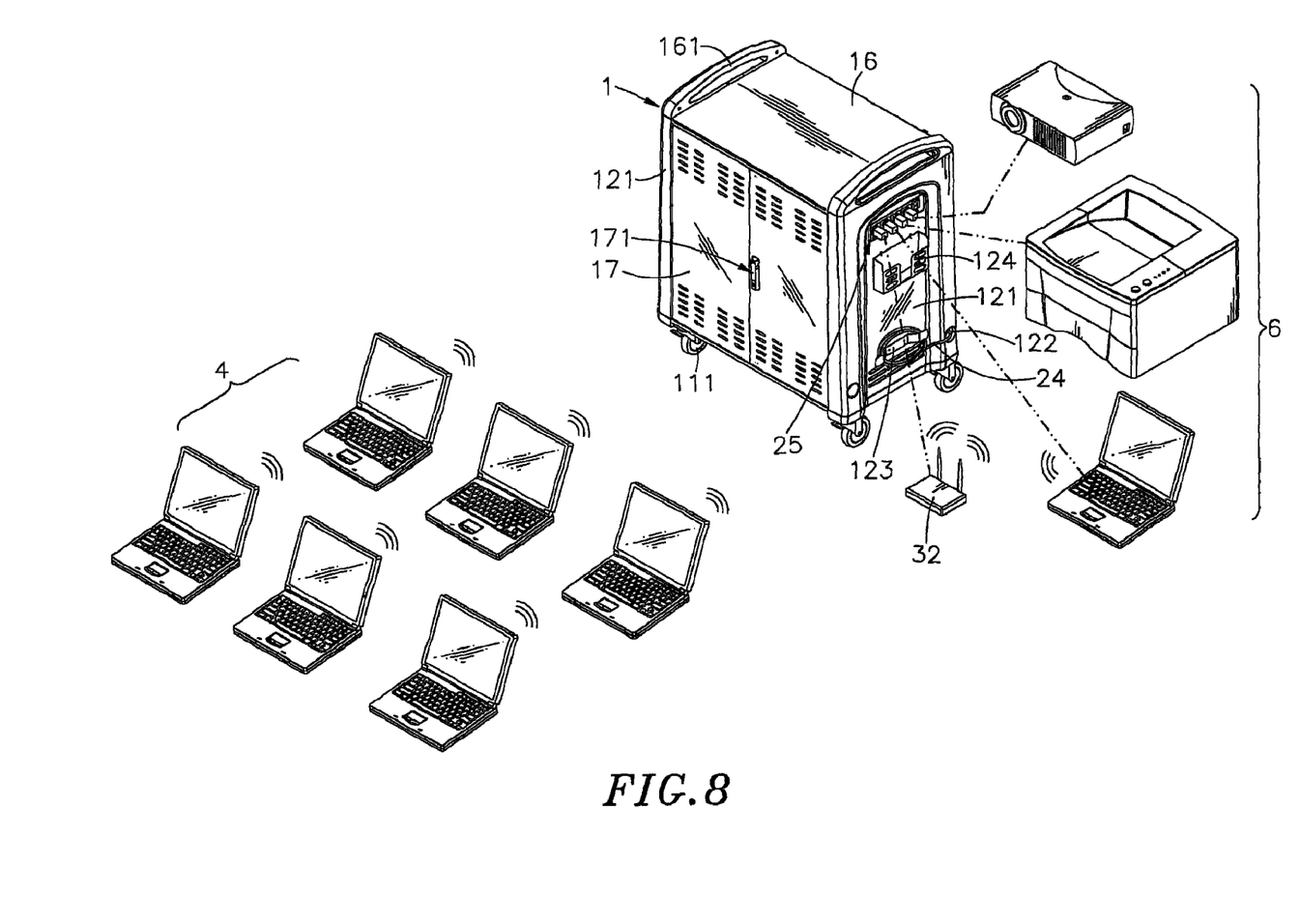
FIG. 8 is a schematic drawing illustrating a status of use of the present invention.

Referring to FIGS. 6~8, when using the notebook computer storage and charging cart, open the lock 171 of the front door panels 17 and the lock 181 of the rear door panels 18 with the assigned key or keys, and then bias the handle of the lock 171 or 181 upwardly through 90 degrees for allowing opening of the front door panels 17 or rear door panels 18. When pulling the tray 151 of one mobile rack 15 out of the cart 1, press the spring-loaded tenones (not shown) at the respective inner sides of the corresponding sliding rails 153 with the two hands to unlock the respective tray 151 from the respective pair of sliding rails 153, allowing the respective tray 151 to be moved out of the cart 1, and then put one notebook computer 4 on the tray 151 that has been extended out of the cart 1. Further, each tray 151 has anti-slip pads (not shown) located on the top side thereof for positive positioning of one notebook computer 4, and open spaces (not shown) that facilitate heat dissipation. After one notebook computer 4 is positioned on one tray 151 that has been extended out of the cart 1, connect the second adapter cable 232 of one respective battery chargers 23 and one respective second network line 314 of the network connection apparatus 31 of the network unit 3 to the respective mating ports of the notebook computer 4, and then push the notebook computer 4 with the respective tray 151 back to the inside of the cart 1, enabling the respective tray 151 to be locked by the spring-loaded tenones (not shown) of the corresponding sliding rails 153. By means of arranging mobile racks 15 in a stack in each storage chamber 10, the invention facilitates the inventory control of notebook computers 4. After loading of notebook computers 4 in the trays 151 of the mobile racks 15 in the cart 1, the lock 171 of the front door panels 17 and the lock 181 of the rear door panels 18 are locked, avoiding stealing or possible damage.

Further, after storage of multiple notebook computers 4 in the cart 1, the power management device 21 of the power system 2 can be operated to charge the batteries of the storage notebook computers 4. At this time, operate the keypad (not shown) of the power management device 21 to input the set charging time into the microprocessor of the control module (not shown) of the power management device 21. After input of the set charging time into the power management device 21, the microprocessor of the control module (not shown) of the power management device 21 will immediately display the set charging time through a display module (not shown) of the power system 2 and simultaneously count down the charging time and control the electrical power connectors 22 to charge the storage notebook computers 4 with the battery chargers 23. During charging, the microprocessor of the control module of the power management device 21 monitors the charging status of every notebook computer 4 and indicates the saturation status of each notebook computer 4 being charged by means of turning on corresponding number of indicator lights (not shown). When the set charging time is up, the power management device 21 automatically cuts off power supply from the electrical power connectors 22 to stop charging. Further, when the power management device 21 is started up again after a power failure, it starts charging the storage notebook computer 4 subject to the lastly set charging time. This memory function enhances the functions and effects of the notebook computer storage and charging cart.

When using the notebook computer storage and charging cart of the present invention, put the signal transmitting and receiving device 32 of network unit 3 in the box 124 in one side cover shell 121 of the cart 1, allowing connection between the storage notebook computers 4 and the network connection apparatus 31 to establish a wireless local area network environment. Further, the built-in network cards of the storage notebook computers 4 support Wake-On-LAN. Thus, a remote user can transmit a wake-up signal to one specific storage notebook computer 4 through the internet via a virtual server to boot the assigned the notebook computer 4. At this time, the power system 2 provides the necessary working voltage. Thus, the remote user can control the assigned notebook computer 4 to download or update educational software, multimedia supplementary teaching materials or any other related software programs, saving much update operation time and labor in taking the storage notebook computers 4 in and out of the cart 1, and improving the update operation efficiency. This wireless remote update operation is free from the limitations of time and space. Therefore, the invention facilitates management of multiple notebook computers 4 and rapid update of the educational content and related software programs stored in the notebook computers 4, assuring uniformity of teaching content and real-time update.

When user is going to start online teaching or to hold an online conference, take multiple storage notebook computers 4 out of the cart 1 and put them in selected places. After startup of the selected notebook computers 4, the signal transmitting and receiving device 32 of network unit 3 is connected to an external wireless network or the internet to run an online teaching, video conference or electronic whiteboard function. By means of providing a virtualized learning environment and global learning sources, the invention greatly enhances students' learning interest, and has learning evaluation and follow-up and teaching content update capabilities. Further, external electronic apparatuses 6, such as projector, printer, notebook computer or any of a variety of other computer peripheral apparatuses, can be connected to the electric sockets 251 of the expansion electrical power connectors 25 of the power system 2 to obtain the necessary AC power supply. Further, the electrical plug of the power cable (not shown) of the signal transmitting and receiving device 32 of network unit 3 can be connected to one electric socket 251 of one expansion electrical power connector 25 of the power system 2 to obtain the necessary power supply. This convenient power supply obtaining arrangement greatly enhances the market competitiveness of the notebook computer storage and charging cart.

Further, it is to be understood that the above described particular embodiment is simply an example of the invention for purposes of illustration, i.e., the arrangement of the network connection apparatus 31 of the network unit 3 on the partition panel 13 of the cart 1 to let the first ports 311 and the second ports 312 be disposed at the front edge of the partition panel 13 is simply an installation example of the invention but not a limitation. Alternatively, the network connection apparatus 31 can be installed in the back side of the upright back panel 14 or the partition panel 13 with the first ports 311 and the second ports 312 arranged on the back side of the upright back panel 14 (see FIGS. 3 and 5), allowing wired or wireless communication of the network connection apparatus 31 of the network unit 3 with an external network system, the signal transmitting and receiving device 32 and multiple notebook computers 4 through the first ports 311 and the second ports 312 so that a remote user can control the linked notebook computers 4 to download and update educational software, multimedia supplementary teaching materials or any other related software programs for online teaching.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A notebook computer storage and charging cart, comprising:

a cart, said cart comprising a base frame, two upright side panels respectively upwardly extended from two opposite lateral sides of said base frame, at least one partition panel arranged on said base frame between said two upright side panels in a parallel manner relative to said two upright side panels to divide the holding space between said two upright side panels into a plurality of storage chambers, and a plurality of mobile racks detachably mounted in said storage chambers and arranged in a stack in each said storage chamber for carrying one respective notebook computer;

a power system installed in said cart, said power system comprising a power management device, at least one electrical power connector electrically connected to said electrical power management device, each said electrical power connector comprising a plurality of electric sockets, a plurality of battery chargers detachably and electrically connected to said electric sockets of said at least one electrical power connector and electrically connectable to the notebook computers carried in said mobile racks to charge the notebook computers, and at least one power cable adapted for connecting an external power source to said electric sockets of said at least one electrical power connector; and a network unit, said network unit comprising at least one network connection apparatus installed in said at least one partition panel, each said network connection apparatus comprising a plurality of first ports, a plurality of second ports, a plurality of first network lines respectively connected to said first ports and adapted for connection to external network equipments and a plurality of second network lines respectively connected to said second ports and adapted for connection to the notebook computers carried in said mobile racks to link the notebook computers to said network unit.

2. The notebook computer storage and charging cart as claimed in claim 1, wherein said cart further comprises an upright back panel upwardly extended from a rear side of said base frame between said upright side panels and a rear chamber defined in a back side of said upright back panel opposite to said storage chambers; said power management device of said power system is installed in said upright back panel; each said electrical power connector of said power system is installed in one said upright side panel inside said rear chamber.

3. The notebook computer storage and charging cart as claimed in claim 1, wherein said cart further comprises an upright back panel upwardly extended from a rear side of said base frame between said upright side panels and a rear chamber defined in a back side of said upright back panel opposite to said storage chambers, said upright back panel comprising a plurality of locating blocks located on a back wall thereof at different elevations corresponding to said mobile racks in said storage chambers and a plurality of wire holes around said locating blocks; said battery chargers are respectively mounted in said locating blocks of said upright back panel, each said battery charger comprising a first adapter cable electrically connectable to one said electric socket of one said electrical power connector and a second adapter cable connectable to a mating port of the notebook computer carried in one said mobile rack, the first adapter cables and second adapter cables of said battery chargers being respectively inserted through said wire holes of said upright back panel and secured in place with a respective binder.

4. The notebook computer storage and charging cart as claimed in claim 1, wherein said cart further comprises a top cover covering said upright side panels over said storage chambers, said top cover having a handle located on each of two distal ends thereof, a plurality of front door panels respectively hinged to said upright side panels and adapted for closing said storage chambers, a front door lock adapted for locking said front door panels, a plurality of rear door panels respectively hinged to a rear side of said cart, and a rear door lock adapted for locking said rear door panels.

5. The notebook computer storage and charging cart as claimed in claim 1, wherein said cart further comprises a plurality of wheels pivotally mounted in a bottom side of said base frame, two side cover shells respectively fastened to said two upright side panels, each said side cover shell comprising a plurality of through holes and a bracket for the arrangement of a power cable of each said electrical power connector of said power system.

6. The notebook computer storage and charging cart as claimed in claim 1, wherein said mobile racks are horizontal trays respectively movable in and out of said storage chambers of said cart along sliding rails at said upright side panels and said at least one partition panel, each said horizontal tray having a plurality of wire grooves located on a rear side thereof for arrangement of cables.

7. The notebook computer storage and charging cart as claimed in claim 1, wherein said power management device comprises at least one transmission line electrically connected to said at least one electrical power connector for controlling said battery chargers to charge the notebook computers carried in said mobile racks.

8. The notebook computer storage and charging cart as claimed in claim 1, wherein said power system further comprises a plurality of expansion electrical power connectors respectively electrically connected to said power management device by a respective cable, each said expansion electrical power connector comprising a plurality of electric sockets for power output and a plurality of power switches operable to switch on/off the electric sockets respectively.

9. The notebook computer storage and charging cart as claimed in claim 1, wherein the first ports and second ports of said at least one network connection apparatus of said network system is located on a front side of said at least one partition panel of said cart.

10. The notebook computer storage and charging cart as claimed in claim 1, wherein said network unit further comprises a signal transmitting and receiving device being a wireless base station set in communication with said at least one network connection apparatus for transmitting and receiving network signals; said first network lines are respectively connected between said first ports and said signal transmitting and receiving device.

11. The notebook computer storage and charging cart as claimed in claim 1, wherein said network connection apparatus is selected from a group of router and hub, the first ports and second ports of said network connection apparatus are RJ45 Ethernet jacks.

* * * * *